United States Patent [19]

Burls et al.

[11] Patent Number: 4,762,274
[45] Date of Patent: Aug. 9, 1988

[54] INDUCTOR NOZZLE ASSEMBLY FOR CROP SPRAYERS

[75] Inventors: Gary E. Burls, Amherst; William F. Parmentar, Vermilion, both of Ohio

[73] Assignee: Parker-Hannifin Corporation, Cleveland, Ohio

[21] Appl. No.: 945,195

[22] Filed: Dec. 18, 1986

Related U.S. Application Data

[63] Continuation of Ser. No. 797,698, Nov. 13, 1985, abandoned.

[51] Int. Cl.$^4$ ............................................... B05B 5/02
[52] U.S. Cl. ........................................... 239/3; 239/8; 239/77; 239/112; 239/290; 239/690.1; 239/704
[58] Field of Search ....................... 239/3, 7, 290, 418, 239/420, 423, 424, 424.5, 499, 505, 690, 695, 704–707, 513, 514, 300, 103, 288, 288.3, 288.5, 77, 78, 690.1; 406/93, 144, 153, 194; 251/344, 345

[56] References Cited

U.S. PATENT DOCUMENTS

| | | |
|---|---|---|
| 1,219,642 | 3/1917 | Isaacs . |
| 2,302,185 | 11/1942 | Campbell, Jr. . |
| 2,302,289 | 11/1942 | Bramston-Cook . |
| 3,164,324 | 1/1965 | Bruinsma ............................. 239/77 |
| 3,195,264 | 7/1965 | Ward, Jr. . |
| 3,212,211 | 10/1965 | Bennett . |
| 3,335,943 | 8/1967 | Sorrenti . |
| 3,339,840 | 9/1967 | Point . |
| 3,339,846 | 9/1967 | Guetet ............................. 239/77 |
| 3,398,893 | 8/1968 | Missimer et al. . |
| 3,401,883 | 9/1968 | Gebhardt et al. .............. 239/424 X |
| 3,489,351 | 1/1970 | Patterson . |
| 3,490,695 | 1/1970 | Rittenhouse ............................. 239/77 |
| 3,516,608 | 6/1970 | Bowen et al. . |
| 3,517,888 | 6/1970 | Mitterer ............................. 239/77 X |
| 3,670,963 | 6/1972 | Stroebel et al. . |
| 3,698,635 | 10/1972 | Sickles . |
| 3,747,850 | 7/1973 | Hastings et al. . |
| 3,802,625 | 4/1974 | Buser et al. . |
| 3,917,168 | 11/1975 | Tenney . |
| 4,004,733 | 1/1977 | Law . |
| 4,168,327 | 9/1979 | Law ............................. 427/4 |
| 4,172,557 | 10/1979 | Davis ............................. 239/77 |
| 4,341,347 | 7/1982 | DeVittorio . |
| 4,347,984 | 9/1982 | Sickles ............................. 239/690.1 |
| 4,401,274 | 8/1983 | Coffee . |
| 4,509,694 | 4/1985 | Inculet et al. . |
| 4,527,745 | 7/1985 | Butterfield et al. . |
| 4,565,318 | 1/1986 | Inculet ............................. 239/77 X |
| 4,666,089 | 5/1987 | Inculet ............................. 239/77 |

FOREIGN PATENT DOCUMENTS

| | | | |
|---|---|---|---|
| 1185857 | 1/1965 | Fed. Rep. of Germany ........ | 239/77 |
| 305915 | 2/1933 | Italy ............................. | 239/424 |
| 6612650 | 3/1968 | Netherlands ..................... | 239/77 |
| 2098090 | 11/1982 | United Kingdom ................ | 239/77 |
| 368839 | 11/1970 | U.S.S.R. ............................. | 239/695 |
| 387744 | 10/1973 | U.S.S.R. ............................. | 239/706 |
| 456642 | 2/1975 | U.S.S.R. ............................. | 239/695 |
| 927327 | 5/1982 | U.S.S.R. ............................. | 239/706 |

*Primary Examiner*—Andres Kashnikow
*Assistant Examiner*—Karen B. Merritt
*Attorney, Agent, or Firm*—Christopher H. Morgan

[57] ABSTRACT

An inductor nozzle assembly for use with an air blast sprayer of the type having a tank holding waterborne pesticides, delivery lines connected to the tank and an air blast fan mounted in close proximity to the delivery lines, includes a spray nozzle mounted to the delivery lines which is disposed in the hollow interior of a conical-shaped housing mounted thereto. The housing is formed with an enlarged entrance opening, and a reduced diameter discharge opening which mounts an inductor ring charged with high electrical potential. A high velocity stream of air produced by the air blast fan is directed into the housing through its entrance opening where the air stream is accelerated by the conical shape of the housing toward its discharge opening. The waterborne pesticide supplied to the spray nozzle is ejected through the discharge orifice of the spray nozzle in a finely divided particle stream which is directed into the reduced diameter discharge opening of the housing, charged inductively thereat by the inductor ring and then ejected from the discharge opening by the high velocity air stream produced by the air blast fan for deposition upon the trees of an orchard or other crops. The stream of air from the air blast fan which is accelerated within the housing forms a barrier between the atomized particle stream and the inductor ring to maintain the inductor ring dry and at its full electrical potential.

6 Claims, 2 Drawing Sheets

INDUCTOR NOZZLE ASSEMBLY FOR CROP SPRAYERS

This is a continuation of co-pending application Ser. No. 797,698 filed on 11/13/85, now abandoned.

BACKGROUND OF THE INVENTION

This invention relates to air blast crop sprayers, and, more particularly, to an inductor nozzle assembly for use with an air blast crop sprayer to deposit charged, atomized pesticides onto fruit trees in an orchard.

Air blast sprayers are commonly used to apply pesticides to fruit trees in an orchard, grapevines, and, to a lesser extent, on row crops. Commercially available sprayers of this type generally include a frame adapted to be pulled by a truck or tractor, a tank mounted on the forward end of the frame which holds a mixture of water and pesticide, delivery lines connected to the tank which mount a plurality of spaced spray nozzles and an air blast fan mounted at the rearward end of the frame in close proximity to the spray nozzles. The waterborne pesticide is pumped under pressure through the delivery lines to the nozzles where it is ejected in atomized form and then propelled onto fruit trees in an orchard or grapevines by a high velocity air stream produced by the air blast fan.

The spray nozzles used in most commercially available air blast sprayers are airless nozzles which eject a stream of atomized waterborne pesticide in a variety of spray patterns depending upon the configuration of the discharge orifice of the nozzle. Several nozzles of this type are mounted along the chemical delivery lines of the air blast sprayer and form essentially a mist of waterborne pesticide which is entrained in the air stream produced by the air blast fan and propelled toward the adjacent trees.

One problem with the application of waterborne pesticides in this manner is that complete coverage of the trees is not assured. The waterborne pesticide in atomized form is subject to evaporation before it reaches the tree, and the pesticide which does reach the tree can drip off of the leaves and branches like rainwater. Accordingly, a relatively large quantity of pesticide is required per acre to achieve acceptable coverage of trees, vines or row crops.

SUMMARY OF THE INVENTION

It is therefore among the objects of this invention to provide for improved efficiency in the deposition of waterborne pesticides from an air blast sprayer onto the trees of an orchard by imparting an induced electrical charge to a stream of atomized pesticide from the sprayer so that the pesticide is electrically attracted to the trees.

This objective is accomplished in an inductor nozzle assembly according to this invention which is particularly adapted for use with an air blast sprayer of the type which includes an air blast fan operable to produce a high velocity air stream, and at least one pesticide delivery line disposed on each side of the fan which are connected to a tank containing a mixture of water and pesticide maintained at ground potential.

A plurality of inductor nozzle assemblies of this invention are mounted to the pesticide delivery lines in the path of the high velocity air stream produced by the air blast fan. In a presently preferred embodiment, each inductor nozzle assembly comprises a spray nozzle connected to the chemical delivery line for receiving the waterborne pesticide, and a housing having a wall defining a hollow interior which tapers radially inwardly in a frusto-conical shape from an enlarged entrance opening to a reduced diameter, discharge opening. The spray nozzle is disposed within the hollow interior of the housing and oriented so that its discharge orifice ejects waterborne pesticide in the form of a stream of atomized droplets or particles into the discharge opening in the housing. An inductor ring, charged with a relatively low voltage of about 6,000 volts, is mounted to the wall of the housing at its discharge opening and functions to impart an induced electrostatic charge to the atomized particles. The charged particles are entrained in an air stream flowing through the housing produced by the air blast fan, and are then discharged through the discharge opening in the housing onto the trees or vines to be coated.

More specifically, the spray nozzles employed in the inductor nozzle assembly of this invention are commercially available airless nozzles which operate hydraulically to discharge preferably a conical-shaped pattern of finely divided atomized particles of water-borne pesticide from their discharge orifices. Each spray nozzle includes a barrel having external threads which is adapted to threadedly receive a sleeve having mating internal threads. A plurality of spaced mounting arms extend radially outwardly from the sleeve of the spray nozzle and releasably mount to the wall of the housing for securing the housing to the fixed spray nozzle. The sleeve, and, in turn, the housing are movable axially along the barrel of the spray nozzle upon rotation of the sleeve for varying the position of the inductor ring with respect to the discharge orifice of the spray nozzle.

The waterborne pesticide ejected from the discharge orifice of the spray nozzle is atomized to form a stream of small liquid particles or droplets within a zone of atomization which is spaced a short distance from the discharge orifice. Preferably, the inductor ring mounted in the wall of the housing is located within the zone of atomization to impart a charge to the particle stream. As described above, the housing is rotatable with the sleeve of the nozzle barrel to permit axial movement of the housing with respect to the spray nozzle. This permits the position of the inductor ring relative to the discharge orifice of the spray nozzle to be adjusted to ensure proper positioning of the inductor ring within the zone of atomization. It is contemplated that such adjustment might be necessary if different spray nozzles are employed or if the line pressure of the pesticide supplied by the tank is significantly altered.

An important aspect of this invention is to provide for the ejection of the charged atomized pesticide from the discharge opening of the housing and onto the trees without wetting the inductor ring. If the inductor ring were to become saturated with the water-borne pesticide stream, which is held at or near ground potential, a conductive path from the inductor ring to ground could be created which would cause the inductor ring to lose its electrical potential and become ineffective in charging the pesticide. It is therefore important to create a barrier between the inductor ring ad the waterborne pesticide stream to maintain the inductor ring and adjacent housing dry.

The particle stream of waterborne pesticide from the spray nozzle is prevented from wetting the inductor ring by the configuration of the wall of the housing. As mentioned above, the wall tapers radially inwardly from an enlarged entrance opening to a reduced diameter discharge opening. The housing is mounted to the spray nozzle so that its outer wall tapers inwardly in the direction of movement of the high velocity air stream from the air blast fan. A venturi effect is therefore produced in which the air stream from the air blast fan is accelerated within the housing from its enlarged entrance opening toward the reduced diameter discharge opening thereby creating a moving barrier of air over the surface of the inductor ring at the discharge opening. This barrier or stream of high velocity air prevents the stream of waterborne pesticide from contacting the inductor ring, and also forces the atomized particles out of the discharge opening of the housing and onto the trees to be sprayed.

The charged particle stream of waterborne pesticide produced by the apparatus of this invention more effectively covers the trees in an orchard because the pesticide is electrically attracted to the grounded trees. Whereas prior art spraying systems direct an uncharged mist or spray of waterborne pesticides onto the trees which can run off or drop to the ground like rainwater, the inductively charged fine particle stream of waterborne pesticide produced by the inductor nozzle assembly of this invention is positively attracted to the trees. This can greatly reduce run-off of the pesticide and provide for more complete deposition of the chemicals over the entire surface area of the trees. The deposition efficiency created by electrostatically charging the waterborne pesticide, and by atomizing the stream with an airless spray nozzle to form relatively fine particles or droplets, can result in a substantial reduction in the volume of pesticide required per acre of trees or grapevines. It is estimated that less than ten gallons of pesticide per acre is required to effectively coat the trees of an orchard or grapevines of a vineyard with the apparatus of the invention attached to an air blast sprayer, whereas fifty to one hundred gallons of pesticide per acre are required using conventional spray nozzles in air blast sprayers.

DETAILED DESCRIPTION OF THE DRAWINGS

The structure, operation and advantages of a presently preferred embodiment of this invention will become further apparent upon consideration of the following description, taken in conjunction with the accompanying drawings, wherein.

DETAILED DESCRIPTION OF THE INVENTION

Figure 1:
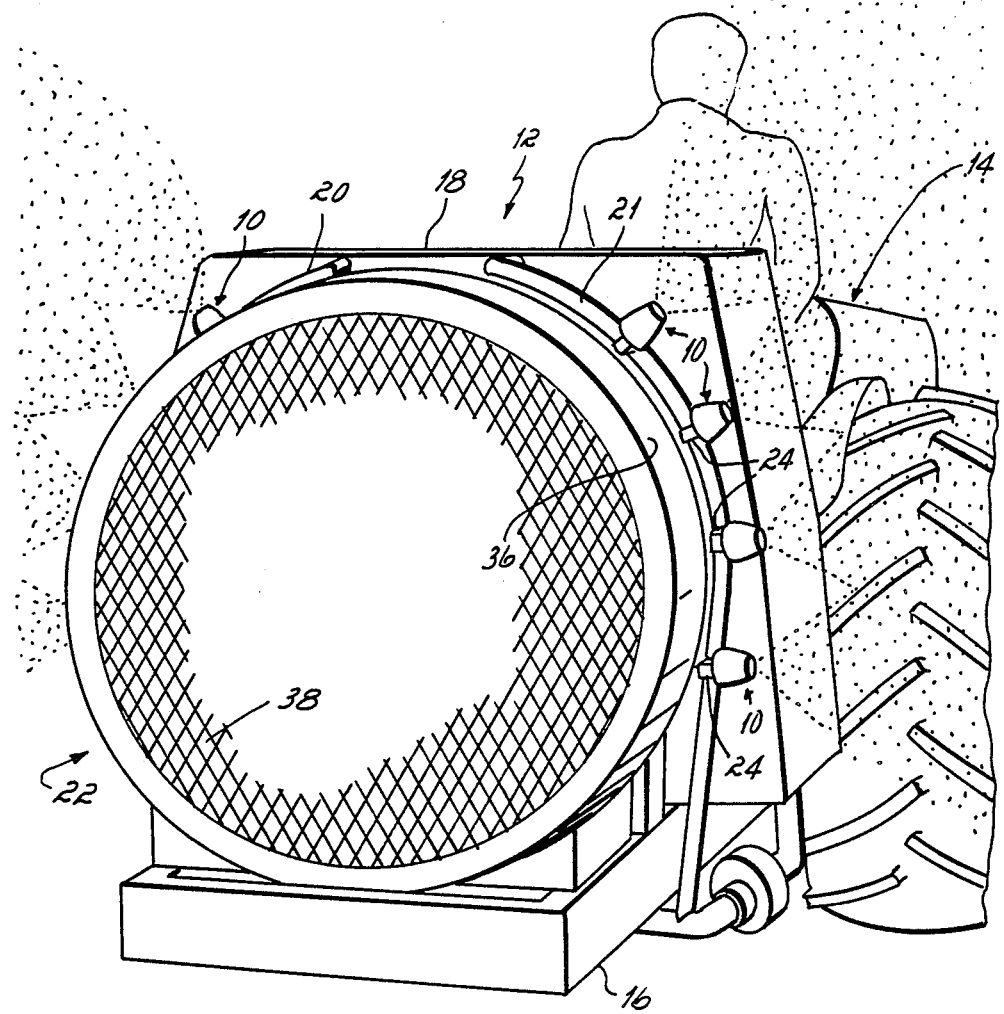
FIG. 1 is a perspective view of an air blast spraying system connected to a tractor, which incorporates the nozzle assembly of this invention.

Referring now to FIG. 1, a plurality of inductor nozzle assemblies 10 according to this invention are shown mounted to an air blast sprayer 12 pulled by a tractor 14. The air blast sprayer 12 includes a frame 16, a tank 18 mounted at the forward end of the frame 16 and containing a mixture of water and pesticide, an air blast fan 22 mounted at the rearward end of the frame 16, and a pair of arcuate fluid delivery lines 20, 21 communicating with the tank 18 which are mounted between the tank 18 and fan 22 on opposite sides of the fan 22. A plurality of nozzle mounting blocks 24 are connected at spaced intervals along both of the fluid delivery lines 20, 21, each of which are adapted to mount an inductor nozzle assembly 10 for transmitting the mixture of water and pesticide thereto.

Figure 2:
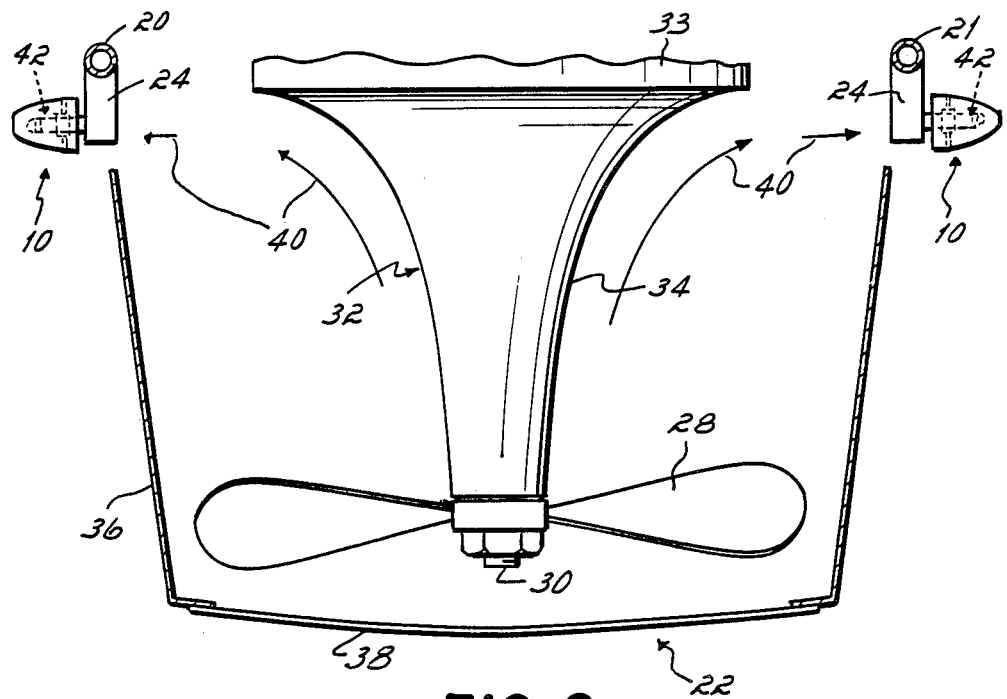
FIG. 2 is a schematic view of the air blast fan of the sprayer system and the path of the air stream it produces for movement through the inductor nozzle assembly herein.

As shown in FIG. 2, the air blast fan 22 includes a fan blade 28 mounted upon a shaft 30 which is disposed within a fixed deflector 32. The deflector 32 is formed with an arcuate outer wall 34 which tapers radially outwardly from the fan blade 28 to the base 33 of the deflector 32. The fan blade 28 and deflector 32 are enclosed within a protective shroud 36 having a screen 38 mounted at its forward end near the fan blade 28. The air blast fan 22 is operable to produce a high velocity air stream 40 which is drawn into the shroud 36 past the screen 38, and then deflected radially outwardly by the arcuate outer wall 34 of the deflector 32 at its base 33. Each of the inductor nozzle assemblies 10 mounted to the fluid delivery lines 20, 21 are positioned in substantially the same vertical plane as the base 33 of the deflector 32, as viewed in FIG. 2, so that they are directly in the path of the air stream 40.

Figure 3:
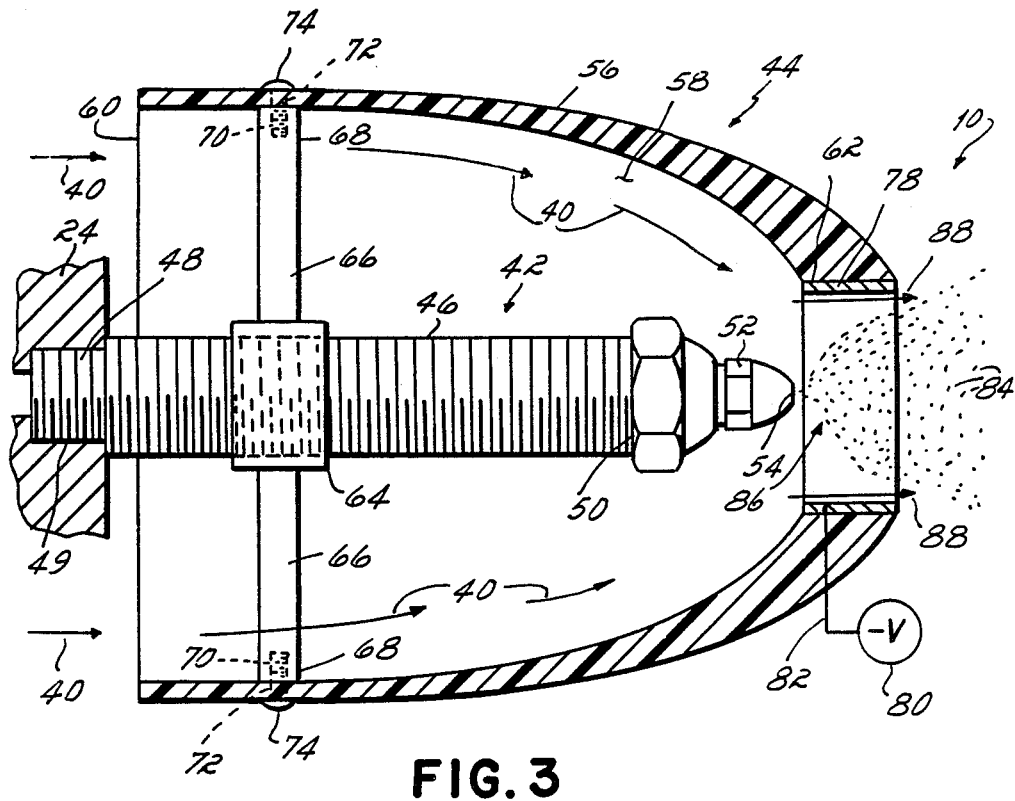
FIG. 3 is a side elevational view in partial cross section of the inductor nozzle assembly of this invention.

Referring now to FIG. 3, the inductor nozzle assembly 10 of this invention includes a spray nozzle 42 disposed within the interior of housing 44 which is mounted thereto. In one presently preferred embodiment of this invention, the spray nozzle 42 is an hydraulically operated, airless nozzle commercially available from Spraying Systems Company of Wheaton, Ill. under Model No. TX2. Similar airless spray nozzles are also available from other sources.

Each spray nozzle 42 includes a hollow barrel 46 formed with external threads along the entire length of its outer wall. The rearward end 48 of the barrel is adapted to thread into a threaded bore 49 formed in the nozzle mounting blocks 24 for connecting the spray nozzle 42 with the waterborne pesticide supplied from tank 18. The waterborne pesticide is maintained at substantially ground potential from the tank 18, through the delivery lines 20, 21 and into the spray nozzles 42. Mounted to the forward end 50 of the barrel 46 is a nozzle tip 52 having a discharge orifice 54 which ejects an atomized stream of waterborne pesticide in the form of finely divided particles or droplets from the spray nozzle 42 and through an opening in the housing 44, as described below. The Spraying Systems Company Model TX2 has a discharge orifice 54 which produces a conical-shaped spray pattern, but it is contemplated that other spray patterns from different shaped discharge orifices of other spray guns would be suitable for use in the inductor nozzle assembly 10 of this invention.

The housing 44 includes a wall 56 formed of a dielectric material which defines a hollow interior 58. The wall 56 tapers radially inwardly from an enlarged entrance opening 60 to a reduced diameter discharge opening 62 forming an essentially frusto-conical shape. The housing 44 is mounted to the fixed spray nozzle 42 by a sleeve 64 and a plurality of mounting arms 66 in a position wherein the discharge orifice 54 of the spray nozzle 42 ejects the stream of atomized pesticide through the discharge opening 62. The sleeve 64 is formed with internal threads which mate with the external threads on the barrel 46 of spray nozzle 42. The mounting arms 66, only two of which are shown in the drawings, extend radially outwardly from the sleeve 64 to the wall 56 of housing 44. The outer end 68 of each mounting arm 66 is formed with a threaded bore 70 which aligns with a bore 72 formed in the wall 56 of housing 44. A screw 74 extends through the bore 72 in the wall 56 and into the threaded bore 70 of mounting arm 66 to secure the housing 44 to the sleeve 70. The sleeve 64, and, in turn, the housing 44, are rotatable with respect to the threaded barrel 46 for axial movement thereof along the spray nozzle 42. Preferably, the housing 44, mounting arm 66 and screws 74 are formed of a suitable dielectric material.

As shown in FIG. 2, the housing 44 of the inductor nozzle assembly 10 is oriented with respect to the air stream 40 produced by the air blast fan 22 so that the wall 56 of the housing 44 decreases in diameter or tapers inwardly in the direction of movement of the air stream 40. The wall 56 thus produces a venturi effect in which the air stream is accelerated in moving from the enlarged entrance opening 60 to the discharge opening 62, for purposes to become apparent below.

An inductor ring 78 is mounted to the wall 56 of housing 44 at its discharge opening 62. The inductor ring 78 is preferably a circular band of an electrically conductive material which does not deteriorate in the presence of the pesticide ejected from the discharge orifice 54 of the spray nozzle 42. The inductor ring 78 is charged with an electrical potential in the range of approximately 6,000 volts by a source of voltage 80 connected to the inductor ring 78 by an electrical line 82, shown schematically in FIG. 3.

The advantages of the inductor nozzle assembly 10 according to this invention are best understood with reference to a description of the method of its operation in spraying waterborne pesticides upon the trees of an orchard. Waterborne pesticide or fertilizer is first directed, under pressure, into the hollow barrel 46 of spray nozzle 42 through the nozzle mounting blocks 24. Spray nozzles 42 are disposed at intervals along each of the arcuate fluid delivery lines 20, 21 on opposite sides of the air blast fan 22, from ground level to a point just short of vertical as viewed in FIG. 1, to cover the complete height of the trees to be coated on both sides of a row (not shown). The waterborne pesticide is ejected from the discharge orifice 54 to form an atomized stream of particles or droplets 84 in a generally conical-shaped spray pattern. Atomization of the waterborne pesticide occurs at a short distance from the discharge orifice 54 of the spray nozzle 42 within a zone of atomization labeled generally with the reference number 86.

An important aspect of this invention is the application of an inductive charge upon the atomized stream of droplets 84 by inductor ring 78 within the zone of atomization 86. The negatively charged inductor ring 78 applies a positive electrostatic charge on the droplets 84 by induction before they exit the discharge opening 62 of the housing 44. The positively charged droplets 84 are then attracted to the grounded trees onto which they are sprayed which greatly improves the deposition efficiency and substantially reduces the loss of pesticide due to run-off.

The spacing between the discharge orifice 54 and inductor ring 78 is chosen so that the inductor ring 78 is positioned within the zone of atomization 86. The location of the zone of atomization 86 is dependent upon the line pressure at which the waterborne pesticide is supplied to the spray nozzle 42 from the tank 18, and, to some extent, the configuration of the discharge orifice 54. Variations in the location of the zone of atomization are compensated for by the adjustment capability of this invention. As described above, the axial position of the housing 44, and, in turn, the inductor ring 78, is varied with respect to the discharge orifice of the spray nozzle 42 by rotating sleeve 64 along the nozzle barrel 46. Preferably, the width of the inductor ring 78 is about 0.5 inches.

In order to ensure that the atomized stream of droplets 84 is properly charged, the inductor ring 78 must be maintained at its full electrical potential. If the stream of waterborne pesticide which is held at ground potential was permitted to wet the surface of the inductor ring 78, a conductive path from the inductor ring 78 to ground could be created which would ground the inductor ring 78 and render it ineffective in charging additional droplets 84.

The inductor ring 78 is maintained dry by a barrier of air which results from a venturi effect created by the conical-shape of the wall 56 of housing 44. As mentioned above, the high velocity air stream 40 produced by the air blast fan 22 is directed radially outwardly by the arcuate outer walls 34 of deflector 32 toward the inductor nozzle assemblies 10. The air stream 40 enters the enlarged entrance opening 60 of the housing 44 and moves toward the discharge opening 62. Because the discharge opening 62 is of reduced diameter compared to entrance opening 60, the housing 44 acts like a venturi and accelerates the air stream 40 from the entrance opening 60 to the discharge opening 62. The accelerated stream of air forms a thin barrier 88 between the atomized stream of waterborne pesticide held at ground potential and the charged inductor ring 78, and also expels the atomized stream of droplets 84 out of the housing 44 through the discharge opening 62 after they become electrostatically charged. The barrier 88 prevents the inductor ring 78 from becoming saturated with the waterborne pesticide and thus maintains the inductor ring 78 at substantially its full electrical potential.

The diameter of the discharge opening 62 and inductor ring 78 are preferably large enough to provide a space for the air barrier 88 between the conical spray pattern of the stream of atomized droplets 84 and the inductor ring 64. Using a Spraying Systems Company Model TX2 spray nozzle 42 with an air blast fan 22 which produces an air stream 40 having a velocity of about 100 mph at the enlarged entrance opening 60 of housing 44, it has been found that an inductor ring 78 of about 1.3 inches in diameter is large enough to accomodate both the spray pattern and air barrier 88. The air barrier 88 therefore functions both to maintain the inductor ring 78 dry, and, together with the remainder of the accelerated air stream flowing through the housing 44, to propel the stream of atomized droplets 84 outwardly from the discharge opening 62 and onto the trees to be coated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An inductor nozzle assembly for use in an air blast sprayer to deposit chemicals onto object crops such as trees in an orchard, grapevines and row crops on both sides of a row, the air blast sprayer including an air blast fan operable to produce a high velocity air stream and delivery lines carrying the chemicals disposed on opposite sides of the air blast fan, said inductor nozzle assembly comprising:

a spray nozzle adapted to mount to the delivery lines for receiving chemicals therefrom, said spray nozzle having a discharge orifice operable to discharge the chemicals in an atomized particle stream;

a housing having a substantially conical-shaped wall defining an exterior about which air from said air blast fan can flow and a hollow interior formed with a cross section tapering radially inwardly from an entrance opening to a reduced diameter discharge opening, said spray nozzle being disposed within said hollow interior and oriented so that said discharge orifice ejects said atomized particle stream into said discharge opening;

an inductor ring mounted to said wall of said housing at said discharge opening, said inductor ring applying an induced electrical charge to said particle stream ejected into said discharge opening; and said spray nozzle and said housing being positioned along the delivery line of the air blast sprayer with respect to the air blast fan so that the high velocity air stream from the air blast fan forms an exterior stream of air which flows about said exterior of said housing and an interior flow of air which enters said housing through said entrance opening and moves toward said reduced diameter discharge opening, the interior air stream being accelerated within the tapered hollow interior of said housing from said entrance opening to said reduced diameter disharge opening to form a barrier of air between said inductor ring and said atomized particle stream; said interior and exterior air streams together propelling the charged particles stream toward object crops.

2. The inductor nozzle assembly of claim 1 in which said spray nozzle includes a barrel having an outer wall formed with external threads, and a sleeve having internal threads engageable with said external threads of said barrel, said sleeve being rotatable with respect to said barrel for axial movement therealong.

3. The inductor nozzle assembly of claim 2 further including a plurality of spaced mounting arms each having an inner end connected to said sleeve and an outer end extending radially outwardly to said wall of said housing, and means for releasably mounting said mounting arms to said wall of said housing.

4. The inductor nozzle assembly of claim 3 in which said wall of said housing is formed with a plurality of spaced bores in alignment with said mounting arms, said outer end of each said mounting arms being formed with an internally threaded bore adapted to receive a screw inserted through said bores in said wall of said housing for mounting said housing to said spray nozzle.

5. A method of depositing chemicals onto crops on both sides of a row with an air blast sprayer including an air blast fan operable to produce a high velocity air stream and delivery lines carrying the chemicals, comprising the steps of:

discharging the chemicals in an atomized particle stream from the discharge orifice of a spray nozzle into a reduced diameter discharge opening formed in the tapered wall of a housing having an enlarged entrance opening spaced from said reduced diameter discharge opening;

charging the atomized particle stream with an inductor ring mounted to said tapered wall at said reduced diameter discharge opening of said housing to form a charged particle stream;

directing the high velocity air stream produced by the air blast fan outside said housing and into said entrance opening of said housing to form an exterior air stream and an interior air stream which together propel the charged particle stream toward crops; and accelerating the high velocity interior stream of air directed into said housing from said enlarged entrance opening to said reduced diameter discharge opening so that said interior air stream forms a barrier of air between said inductor ring and the atomized particle stream to maintain said inductor ring dry in addition to propelling said charged particles toward the crops.

6. The method of claim 5 in which said step of accelerating the high velocity stream of air produced by the air blast fan further comprises the step of:

forming a barrier of air between said inductor ring and the atomized particle stream to maintain said inductor ring dry.

* * * * *